(No Model.)
H. FRICKER.
PROCESS, METHOD, OR ART OF COOKING EDIBLES.
No. 411,378. Patented Sept. 17, 1889.
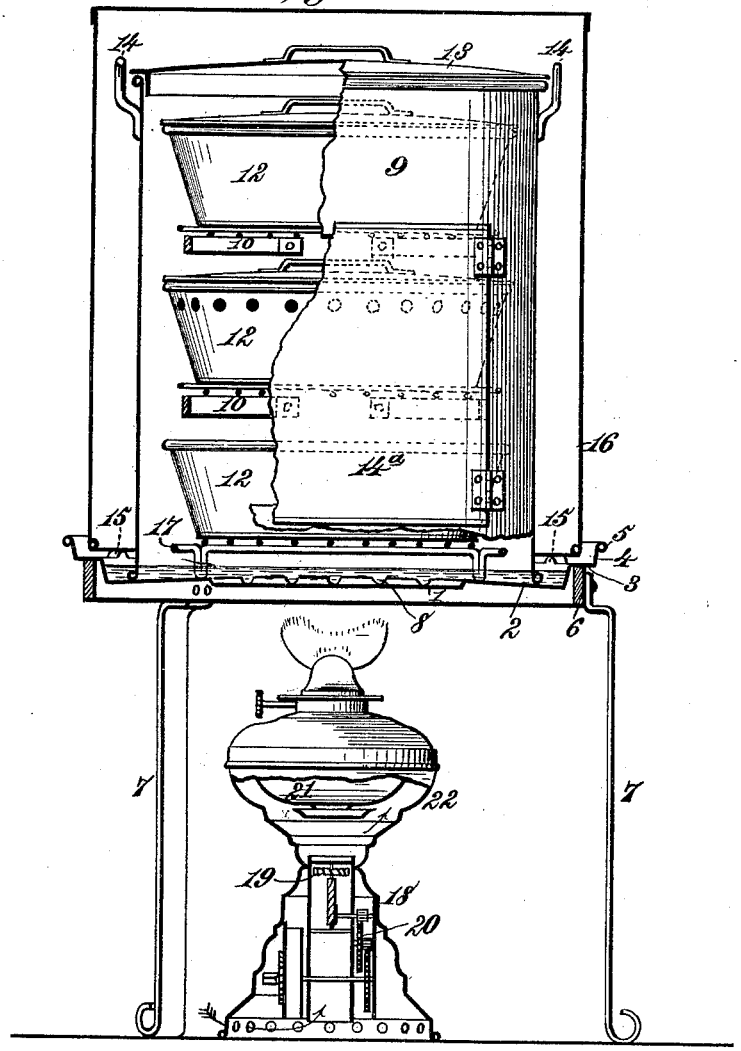
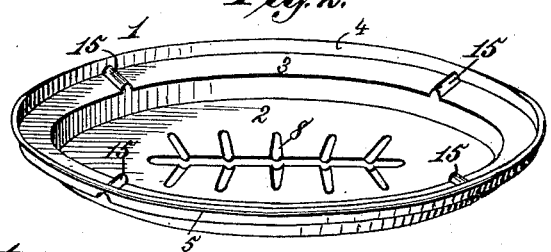
Witnesses:
Robert Everett
J. Grant Myers Jr.
Inventor:
Henry Fricker
By James L. Norris
Atty.

UNITED STATES PATENT OFFICE.

HENRY FRICKER, OF LONDON, ENGLAND, ASSIGNOR TO FRANK L. WANZER, OF HAMILTON, CANADA.

PROCESS, METHOD, OR ART OF COOKING EDIBLES.

SPECIFICATION forming part of Letters Patent No. 411,378, dated September 17, 1889.

Application filed July 23, 1889. Serial No. 318,425. (No model.) Patented in England November 16, 1887, No. 15,734; in France December 20, 1887, No. 187,724; in Belgium December 21, 1887, No. 80,012; in Cape of Good Hope April 4, 1888; in Natal April 5, 1888, No. 13; in Spain September 10, 1888, No. 8,672; in Canada January 18, 1889, No. 28,376; in India January 23, 1889, No. 18; in South Australia January 25, 1889, No. 1,225; in Victoria January 25, 1889, No. 6,494; in New South Wales January 28, 1889, No. 1,209, and in Tasmania January 31, 1889, No. 655.

*To all whom it may concern:*

Be it known that I, HENRY FRICKER, a subject of the Queen of Great Britain, residing at London, England, have invented new and useful Improvements in the Process, Method, or Art of Cooking Edibles, (for which I have obtained patents in Great Britain, No. 15,734, dated November 16, 1887; in France, No. 187,724, dated December 20, 1887; in Belgium, No. 80,012, dated December 21, 1887; in Cape of Good Hope, dated April 4, 1888; in Natal, No. 13, dated April 5, 1888; in Spain, No. 8,672, dated September 10, 1888; in Canada, No. 28,376, dated January 18, 1889; in India, No. 18, dated January 23, 1889; in South Australia, No. 1,225, dated January 25, 1889; in Victoria, No. 6,494, dated January 25, 1889; in New South Wales, No. 1,209, dated January 28, 1889, and in Tasmania, No. 655, dated January 31, 1889,) of which the following is a specification.

It is the purpose of my present invention to provide a process or method of cooking and preparing edible substances to be used as food, whereby I obtain a marked improvement in quality and flavor and a considerable economy of the tissues, juices, or substance of the materials operated upon.

It is the purpose of my invention to provide a process or method of cooking edible substances whereby food of different kinds may be prepared at the same time and in the same vessel, chamber, or container, and whereby each of the different substances treated shall be cooked thoroughly and delicately, rendered highly nutritious and easy of digestion, and all the qualities which impart rich flavor perfectly preserved, while every one of the different substances shall be thoroughly and properly cooked throughout, or from the outside to the center, without loss of nutrition and without acquiring from or imparting to any other substances simultaneously cooked in the same closed chamber any odor or flavor whatever.

It is my further purpose to provide a novel culinary process by which the several distinct processes of boiling and steaming as applied to different edible substances may all be carried on at the same time within the same containing-chamber and by the agency of the same heating and cooking vapor, the results produced being uniformly successful without requiring previous experience or skill on the part of the operator and being obtained at a mere nominal expense for fuel and without requiring special care or attention, the only services required on the part of the cook being to place the articles properly prepared in the closed insulated containing-chamber, to set the heat-generator in operation, and to remove the edible substances at the end of a given period of time.

It is one characteristic feature of said invention that the edible substances operated upon may, if desired, be all placed in the closed chamber at the same time, subjected to the process for the same period, and all removed together or at the same moment, each one thoroughly and exquisitely cooked without being over or under done.

The invention consists, first, in a process, method, or art of cooking meats, vegetables, and other articles of food, which consists in subjecting them to a gradually-increasing temperature in an insulated, closed chamber, and to an atmosphere of steam constantly and uniformly produced and condensed therein, generated by an outer heat-creating agent, whereby the articles of food are subjected to a gentle, persistent, and slowly-increasing bath heat, which penetrates and permeates each of said articles; second, in a process, method, or art of cooking meats, vegetables, and other articles of food, which consists, substantially, in subjecting the edible substances operated upon to the action of a gradually-increasing temperature in a closed chamber, and to an atmosphere of steam constantly produced and condensed therein, generated by a gentle exterior-regulated heat applied to one part of said chamber, whereby a gentle, persistent, and slowly-increasing bath heat is created in said chamber and housed or husbanded therein, and caused to surround the edibles or containing-vessels in which they are placed on every side, penetrating and permeating every article of an edible character which is subjected thereto or within reach thereof, thoroughly cooking both meats and vegetables, preserving and enhancing all the distinctive and characteristic flavors of each, retaining the essential juices, avoiding the loss of nutrition caused by prior processes and retaining the essential essences and rich flavoring matters which are ordinarily boiled, evaporated, or dissolved out of the same substances in the usual methods of cooking, and, finally, enabling an unskilled cook to prepare different kinds of food as well and better than a skilled operator can produce them by any of the methods now in use.

To enable others to practice my said invention, I will now proceed to describe the same in detail, reference being made to the accompanying drawings, in which I show one form of apparatus by which my invention may be practiced, and in which—

Figure 1 is a vertical central sectional view of an apparatus used in carrying out the invention; and Fig. 2 is a detail view of the bottom tray or pan, in which a sheet of water is placed and from which steam is produced.

In the drawings, the reference-numeral 1 denotes an open tray or pan having a depressed central portion 2 and provided with an annular surrounding portion 3, from which rises a flange or edge 4, having an annular bead 5 to stiffen and support it. The annular part 3 rests upon a ring 6, to which legs 7 are secured pivotally in any well-known manner. The bottom of the central portion 2 is corrugated, as at 8, to increase the area of the surface thereof, both outside and inside.

Upon the central portion 2 and within the annular surrounding portion 3 rests a removable closed container 9, of nearly cylindrical form, this shape being the most convenient and capacious, though other forms may be used. This container is provided upon its interior with brackets or supports 10, adapted to support cooking or food-containing dishes 12. A removable cover 13 is applied to the open top, which is also provided with handles 14 to facilitate the removal of the container, and a door 14ª is formed in its cylindrical wall to permit the insertion and removal of the dishes resting on the brackets 10. When the cover 13 is in place and the door 14ª closed, the container is practically steam-tight.

Resting on beads or corrugations 15, formed on the surrounding annular portion 3, is an outer containing vessel or casing 16, which is entirely closed and impermeable, save as to the narrow ventilating-space between its edges and the horizontal portion 3. This outer vessel or casing is of such diameter that an air-space is formed between it and the container 9, and its height is such that a similar space is formed over the container 9, continuous with the annular air-space surrounding the inner container. A cooking-vessel 12 rests upon a separate support or grid 17, by which it is raised somewhat above the central portion 2, leaving a suitable space between the bottom of the vessel and the pan or tray 1 beneath. This construction enables the several vessels to be inserted and removed without difficulty. The uppermost vessel 12 may be removed or inserted through the top of the container 9, while the central vessel is inserted and removed through the door 14ª. The lower vessel is inserted and removed by raising the container off the bottom or central portion of the pan. The heat and vapor are thus permitted to freely circulate through all parts of the container and upon every side of each one of the food-containing vessels.

A small quantity of water is placed in the pan or tray 1 and lies in a shallow sheet in the central depressed portion 2, rising above the edge of the inner container 9 and producing a water-seal. A heat-generator 18 is then placed beneath the pan and ignited. This heat-generator consists, preferably, of a lamp burning paraffine or other similar oil, in which the combustion is aided and intensified by a forced draft produced by a small fan 19, revolved by any ordinary train of clock-gearing 20. This fan, with its operating mechanism, is placed in the base of the lamp and the current of air produced is drawn through air-apertures in the lamp-standard and passes upward between the oil-reservoir 21 and the outer wall 22 of the lamp to the point of combustion, producing a brilliant flame, thoroughly consuming all the products of combustion and giving a gentle, regulated heat. The flame acts directly upon the central depressed portion 2, containing the corrugations 8, and, acting upon the increased surface thus formed, it heats and soon generates steam from the small body of water contained in the pan. The steam thus generated rises in the inner containing-vessel and penetrates every part thereof, and, condensing within the said inner container, the water is returned to the pan below. This generation and condensation of steam and vapor proceeds constantly and uniformly, or substantially so, within the closed chamber, and by such condensation the steam is constantly caused to give forth its latent heat, whereby a gentle, persistent, and gradually-increasing bath heat is created in the closed chamber, surrounding all the edible substances and readily absorbed by them. As the process continues the heat gradually increases, the steam acquires a higher tension and becomes drier, and the heat it yields is continually absorbed by and penetrates the substance of the several materials contained in the dishes or vessels, to facilitate which openings 23 may, if desired, be made in the walls of said vessels. This gentle and slowly-increasing bath heat penetrates every atom of the vegetable and animal tissues exposed thereto, cooking each article of food evenly throughout and retaining in each its peculiar and characteristic flavors and nutritious qualities, without communicating to any of the others any odor or taste.

The process, considered as an entirety, presents the following characteristic features: The food, of whatever kind, is placed within a closed chamber, which is not necessarily raised to a given temperature prior to its introduction. The heat-generator then acts upon the bottom portion, creating within a mild, but gradually-increasing bath heat, which surrounds the food-containing vessels on every side. As the interior temperature rises to between 120° and 140° Fahrenheit the cooking process begins and the albumen of the food gradually coagulates. This coagulation extends at first only to that superficial stratum or outer thick layer through which heat at the temperature producing coagulation has thus far penetrated; but as the process continues the penetration and permeation of the persistent bath heat extends inward, gradually approaching the core or center. By the gradual coagulation of the albuminous particles they are converted into a soft, tender substance, which is an excellent conductor of heat, thereby promoting the penetration of the bath heat. Moreover, by the gradual and persistent action of this heat a certain small percentage of the water contained in meat is slowly evaporated, allowing the necessary contraction in volume of the tissues, without squeezing out the essential juices and most nutritious constituents, as is commonly done where meat is suddenly introduced within a highly-heated closed chamber. Thus the only substance expelled from the food by this process is the water normally contained therein, every particle of the rich nourishing and flavoring juices and essences being retained.

Among the numerous advantages I secure may be mentioned the increased ease of digestion and the marked increase in nutrition, with their consequent effect upon health and comfort; the remarkable improvement in delicacy, flavor, and richness of the food prepared by this process, and the astonishing economic results obtained, it being perfectly feasible to cook a dinner of four courses for eight or ten persons at a cost of fuel of less than one-half of one cent, besides the preservation of the nutritive elements, by which a saving is effected of the most valuable contents of the meat or other flesh, and, finally, the economy of time, the saving in labor, and the preservation of comfort, as no attention need be given to the food beyond placing it in and removing it from the containing-chamber at the proper time; the increased comfort in summer by avoiding great heat and large consumption of fuel; the cleanliness, simplicity, and uniformity of operation and result, and the entire absence of odors of any kind whatever, whereby the process might be practiced in a drawing-room without the slightest evidence to the senses of those present.

The quantity of water employed is very small, about one pint being sufficient to cook a dinner of four courses for eight or ten people, while to thoroughly cook a thirty-pound ham less than two gills of water is required. As this water is gradually converted into vapor and then to steam, it condenses upon the inner surface of the container and upon the food-containing vessels and is returned to the pan, there being very little waste. As the condensations take place the steam yields up a portion of the heat by which it was maintained in the form of vapor, and the water formed by such condensation is returned to the pan, where it is again converted into steam. These successive accretions of temperature are housed and stored in the closed chamber and absorbed by the food, a small per cent. only being lost by radiation. To generate and sustain the gentle bath heat produced in the inner vessel or container, and to house or store the same therein, the outer insulating container or jacket is a great aid, and by its use I obtain the perfect results accomplished. It is evident, however, that results of a less perfect character may be accomplished by using a single container only; but I consider the outer insulating-container essential to the accomplishment of the best results.

By this invention meat and flesh are cooked in their own juices, all odor is avoided, and the communication of flavor from one substance to another is prevented, while the danger of injuring food by subjecting it to a degree of heat above or below that required is never experienced. Moreover, each article of food may be put in and removed simultaneously with all the other articles, and all will be cooked throughout and thoroughly without being overdone.

By my invention I am able to not only cook by baking, steaming, or boiling, but I am also able to cook and thoroughly prepare any food that can be cooked by steam upon a range or stove, beside the capacity of carrying on several different operations in the same chamber at the same time, as above set forth. I am also able to cook frozen meat without previously thawing it, and cook the same thoroughly and uniformly without loss of nutrition, which has been heretofore wholly impossible by any process capable of being practiced by a stove or range. In operating upon frozen meats, which are placed in the cooking-chamber while frozen hard, the action of the bath heat is so mild and yet so persistent that it thaws the meat and so gently penetrates its tissues as to expel the frost and coagulate the albuminous matter without violently contracting the tissues. Thus the juices and essential constituents of the meat are practically sealed up in the mass, while the conductivity of the coagulated atoms of albumen facilitates the further penetration of the heat and the completion of the process, as has been already set forth.

What I claim, and desire to secure by Letters Patent, is—

1. The process, method, or art, substantially as hereinbefore set forth, of cooking meats, vegetables, and other articles of food, which consists in subjecting them to a gradually-increasing temperature in an insulated closed chamber, and to an atmosphere of steam constantly and uniformly produced and condensed therein, generated by an outer heat-creating agent, whereby the articles of food are subjected to a gentle, persistent, and slowly-increasing bath heat, which penetrates and permeates each of said articles, substantially as described.

2. The process, method, or art herein set forth of cooking meat, vegetables, and other articles of food, which consists in subjecting them to a gradually-increasing temperature in a closed chamber or vessel, and to an atmosphere of steam constantly produced and condensed therein, generated by a gentle, regulated heat applied to one part of said chamber, whereby a gentle, persistent, slowly-increasing bath heat is produced and housed within said chamber, and caused to penetrate and permeate the articles of food, substantially as described.

In witness whereof I have hereto signed my name, in the presence of two subscribing witnesses, this 12th day of July, 1889.

HENRY FRICKER.

Witnesses:
RICHARD CORE GARDINER,
CHARLES ALFRED GROSSETETE,
*Both of 166 Fleet Street, London, England.*